United States Patent
Barkan et al.

(10) Patent No.: US 12,093,305 B2
(45) Date of Patent: *Sep. 17, 2024

(54) MACHINE LEARNING MULTIPLE FEATURES OF DEPICTED ITEM

(71) Applicant: Microsoft Technology Licensing, LLC, Redmond, WA (US)

(72) Inventors: Oren Barkan, Rishon Lezion (IL); Noam Razin, Jerusalem (IL); Noam Koenigstein, Tel Aviv (IL); Roy Hirsch, Ramat Yishai (IL); Nir Nice, Salit (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/211,352

(22) Filed: Jun. 19, 2023

(65) Prior Publication Data

US 2023/0334085 A1    Oct. 19, 2023

Related U.S. Application Data

(63) Continuation of application No. 17/836,779, filed on Jun. 9, 2022, now Pat. No. 11,720,622, which is a (Continued)

(51) Int. Cl.
*G06F 16/532* (2019.01)
*G06F 17/18* (2006.01)
(Continued)

(52) U.S. Cl.
CPC ............ *G06F 16/532* (2019.01); *G06F 17/18* (2013.01); *G06N 3/045* (2023.01); *G06N 3/08* (2013.01);
(Continued)

(58) Field of Classification Search
CPC ........ G06F 16/532; G06F 17/18; G06F 16/56; G06F 16/583; G06N 3/045; G06N 3/08;
(Continued)

(56) References Cited

U.S. PATENT DOCUMENTS

| | | | | |
|---|---|---|---|---|
| 5,930,748 A | * | 7/1999 | Kleider | ................... G10L 17/04 704/246 |
| 7,218,759 B1 | * | 5/2007 | Ho | ....................... G06V 40/162 382/199 |

(Continued)

*Primary Examiner* — Xuemei G Chen
(74) *Attorney, Agent, or Firm* — Workman Nydegger

(57) ABSTRACT

Machine learning multiple features of an item depicted in images. Upon accessing multiple images that depict the item, a neural network is used to machine train on the plurality of images to generate embedding vectors for each of multiple features of the item. For each of multiple features of the item depicted in the images, in each iteration of the machine learning, the embedding vector is converted into a probability vector that represents probabilities that the feature has respective values. That probability vector is then compared with a value vector representing the actual value of that feature in the depicted item, and an error between the two vectors is determined. That error is used to adjust parameters of the neural network used to generate the embedding vector, allowing for the next iteration in the generation of the embedding vectors. These iterative changes continue thereby training the neural network.

20 Claims, 15 Drawing Sheets

Related U.S. Application Data continuation of application No. 16/725,652, filed on Dec. 23, 2019, now Pat. No. 11,373,095.

(51) Int. Cl.

| | | |
|---|---|---|
| *G06N 3/045* | (2023.01) | |
| *G06N 3/08* | (2023.01) | |
| *G06N 20/10* | (2019.01) | |
| *G06N 20/20* | (2019.01) | |
| *G06T 7/00* | (2017.01) | |
| *G06V 10/764* | (2022.01) | |
| *G06V 10/82* | (2022.01) | |

(52) U.S. Cl.
CPC ............ *G06N 20/10* (2019.01); *G06N 20/20* (2019.01); *G06T 7/0002* (2013.01); *G06T 7/97* (2017.01); *G06V 10/764* (2022.01); *G06V 10/82* (2022.01); *G06T 2207/20076* (2013.01); *G06T 2207/20081* (2013.01); *G06T 2207/20084* (2013.01)

(58) Field of Classification Search
CPC ...... G06N 20/10; G06N 20/20; G06T 7/0002; G06T 7/97; G06T 2207/20076; G06T 2207/20081; G06T 2207/20084; G06V 10/764; G06V 10/82; G06Q 30/0201; G06Q 30/0251
See application file for complete search history.

(56) References Cited

U.S. PATENT DOCUMENTS

| | | | | |
|---|---|---|---|---|
| 7,590,310 | B2* | 9/2009 | Retterath | G06F 16/5838 382/190 |
| 10,043,109 | B1* | 8/2018 | Du | G06F 18/22 |
| 10,235,679 | B2* | 3/2019 | Liu | G06Q 30/0251 |
| 10,459,901 | B2* | 10/2019 | Merhav | G06F 16/217 |
| 10,498,888 | B1* | 12/2019 | Rute | G06N 20/00 |
| 10,540,378 | B1* | 1/2020 | Hsiao | G06F 18/24 |
| 10,572,885 | B1* | 2/2020 | Guo | G06Q 40/03 |
| 10,621,472 | B1* | 4/2020 | Buibas | G06T 3/10 |
| 10,691,979 | B2* | 6/2020 | Dal Mutto | G06T 7/90 |
| 10,776,417 | B1* | 9/2020 | Ravichandran | G06N 5/046 |
| 10,824,942 | B1* | 11/2020 | Bhotika | G06N 3/08 |
| 10,922,574 | B1* | 2/2021 | Tariq | G06V 10/25 |
| 2003/0078914 | A1* | 4/2003 | Witbrock | G06F 16/9532 |
| 2016/0239984 | A1* | 8/2016 | Watanabe | G06F 16/5838 |
| 2016/0371546 | A1* | 12/2016 | Yadav | G11B 27/34 |
| 2017/0192401 | A1* | 7/2017 | Wexler | H04W 4/029 |
| 2017/0357896 | A1* | 12/2017 | Tsatsin | G06N 3/045 |
| 2018/0005062 | A1* | 1/2018 | Aguera-Arcas | G06V 40/50 |
| 2018/0173495 | A1* | 6/2018 | Podder | G06N 3/044 |
| 2018/0181569 | A1* | 6/2018 | Jarr | G06Q 30/0603 |
| 2018/0181593 | A1* | 6/2018 | Ranzinger | G06V 10/82 |
| 2018/0285397 | A1* | 10/2018 | Huang | G06F 16/24575 |
| 2018/0322891 | A1* | 11/2018 | van den Oord | G06N 3/048 |
| 2018/0325426 | A1* | 11/2018 | Shaw | G16H 40/67 |
| 2019/0065856 | A1* | 2/2019 | Harris | G06F 18/2148 |
| 2019/0278895 | A1* | 9/2019 | Streit | G06N 3/08 |
| 2019/0332846 | A1* | 10/2019 | Wu | G06T 7/55 |
| 2019/0347526 | A1* | 11/2019 | Sunkavalli | G06N 3/084 |
| 2020/0019759 | A1* | 1/2020 | Savchenko | G06N 3/08 |
| 2020/0142978 | A1* | 5/2020 | Salokhe | G06F 18/24 |
| 2020/0175022 | A1* | 6/2020 | Nowozin | G06N 3/047 |
| 2020/0265495 | A1* | 8/2020 | Cho | G06V 10/82 |
| 2020/0272860 | A1* | 8/2020 | Uchiyama | G06N 3/084 |
| 2020/0294294 | A1* | 9/2020 | Petriv | G06N 3/08 |
| 2020/0311198 | A1* | 10/2020 | Poon | G06N 20/20 |
| 2020/0327308 | A1* | 10/2020 | Cheng | G06F 18/253 |
| 2020/0342597 | A1* | 10/2020 | Chukka | G06V 20/698 |
| 2020/0358796 | A1* | 11/2020 | Kundu | G06N 3/084 |
| 2021/0012145 | A1* | 1/2021 | Chaudhari | G06V 30/19167 |
| 2021/0048931 | A1* | 2/2021 | Barzelay | G06Q 30/0601 |
| 2021/0142110 | A1* | 5/2021 | Tian | G06V 20/68 |
| 2022/0004906 | A1* | 1/2022 | Conroy | G06N 20/10 |
| 2022/0358791 | A1* | 11/2022 | He | G06N 3/0464 |

* cited by examiner

MACHINE LEARNING MULTIPLE FEATURES OF DEPICTED ITEM

CROSS-REFERENCE TO RELATED APPLICATIONS

This application is a continuation of U.S. patent application Ser. No. 17/836,779 filed on Jun. 9, 2022, entitled "MACHINE LEARNING MULTIPLE FEATURES OF DEPICTED ITEM," which is a continuation of U.S. patent application Ser. No. 16/725,652 filed on Dec. 23, 2019, entitled "MACHINE LEARNING MULTIPLE FEATURES OF DEPICTED ITEM," which issued as U.S. Pat. No. 11,373,095 on Jun. 28, 2022, which applications are expressly incorporated herein by reference in their entirety.

BACKGROUND

A user may use the browser of a computing system to navigate to various web sites and services. As an example, a user may browse an online vendor, where the user may be presented with a catalog of items to view, rent or purchase. As an example, the user might navigate to an online store to see if there are any items the user wishes to purchase. Typically, online stores present various recommendation channels that contain their latest catalog items. These recommendation channels enable a key discovery experience that allows a user to discover items of interest even when the online catalog is large and the majority of items on offer are not familiar to the majority of users. The recommendation channels provide recommendations based on the item(s) the user is currently viewing.

There are mainly two types of recommendation systems: collaborative filtering recommendation systems and content-based recommendations systems. In collaborative filtering recommendation systems, the recommendation system uses history to determine that users that are interested in the currently-viewed item are typically also interested in another set of one or more items. As an example, if the user has navigated to a smart phone, the collaborative filtering recommendation system may recommend other smart phone accessories (a case, screen protector, and so forth) that users typically purchase along with the phone. In content-based recommendation systems, the recommendation system presents items that have similar features to what the user has already viewed or purchased. As an example, if the user has purchased a tea tree shampoo, the content-based recommendation system may also recommend a tea tree conditioner, based on the common feature that both are hair treatments that use tea tree oil.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to machine learning features of an item depicted in images. Upon accessing multiple images that depict the item, a neural network is used to machine train on the plurality of images to generate embedding vectors for each of multiple features of the item. As an example, there may be an identity embedding vector that represents an identity of the item. Additionally, there may be other embedding vectors for other features of the item. An example of such other embedding vectors might be a category embedding vector that represents a category of the item, a shape embedding vector that represents a shape of the item, a color embedding vector that represents a color of the item, and so forth.

In one embodiment, for each of multiple features of the item depicted in the images, in each iteration of the machine learning, the embedding vector is converted into a probability vector that represents a vector of probabilities that the feature has respective values. That probability vector is then compared with a value vector to determine an error. That error is then used to adjust parameters of the neural network used to generate the embedding vector. These iterative changes continue until the error has been significantly reduced. The neural network may be trained using multiple images of each of multiple items. This allows the neural network to be tuned to accurately generate embedding vectors from images that depict an assortment of items.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein relate to machine learning features of an item depicted in images.

Upon accessing multiple images that depict the item, a neural network is used to machine train on the plurality of images to generate embedding vectors for each of multiple features of the item. As an example, there may be an identity embedding vector that represents an identity of the item. Additionally, there may be other embedding vectors for other features of the item. An example of such other embedding vectors might be a category embedding vector that represents a category of the item, a shape embedding vector that represents a shape of the item, a color embedding vector that represents a color of the item, and so forth.

In one embodiment, for each of multiple features of the item depicted in the images, in each iteration of the machine learning, the embedding vector is converted into a probability vector that represents a vector of probabilities that the feature has respective values. That probability vector is then compared with a value vector to determine an error. That error is then used to adjust parameters of the neural network used to generate the embedding vector. These iterative changes continue until the error has been significantly reduced. The neural network may be trained using multiple images of each of multiple items. This allows the neural network to be tuned to accurately generate embedding vectors from images that depict an assortment of items.

In this description and in the claims, the modifiers "first", "second", "third" and so forth will be frequently used. Unless otherwise indicated, this is done only to distinguish one item from another—such as one embedding vector from another embedding vector. Unless otherwise indicated, such modifiers do not represent any sort of other relationship (such as temporal, order, position, or the like) between the items modified.

Figure 1:
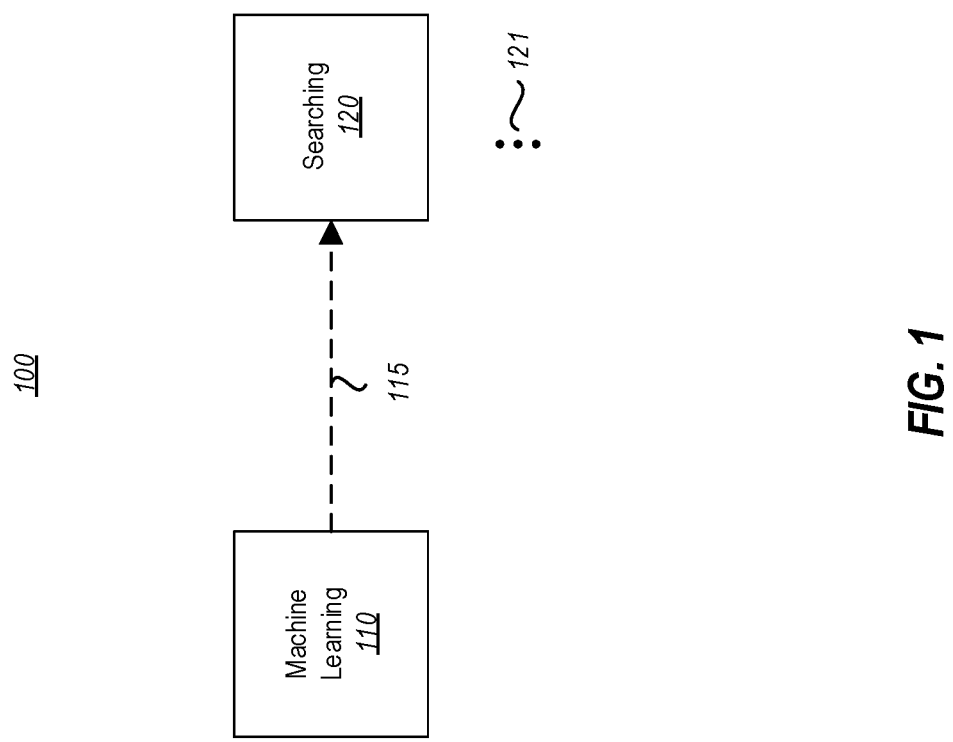
FIG. 1 illustrates a flow associated with searching for depicted items and which includes two phases—a machine learning phase and a searching phase.

FIG. 1 illustrates a flow 100 associated with searching for depicted items. The flow 100 includes two phases—a machine learning phase 110 and a searching phase 120. As represented by dashed-lined arrow 115, the searching phase 120 may occur any time after (e.g., just after or well after) the machine learning phase 110. As represented by the ellipsis 121, the searching phase 120 may be performed any number of times. Each of the phases 110 and 120 may be performed by a computing system, such as the computing system 900 described below with respect to FIG. 9. The same computing system may perform the phases 110 and 120. Alternatively, different computing systems may perform the phases 110 and 120. The machine learning phase 110 will now be described in detail with respect to FIGS. 2 through 5F. Thereafter, the searching phase 120 will be described with respect to FIGS. 6A through 8.

The phases 110 and 120 may each be performed in response to one or more processors (e.g., the hardware processing unit 902) of the respective computing system (e.g., computing system 900) executing computer-executable instructions that are embodied on one or more computer-readable media (such as one or more computer-readable storage media). For instance, the phases may be performed by one or more processors of the executing computing system executing computer-executable instructions that are on one or more computer-readable media (e.g., memory 904).

Figure 2:
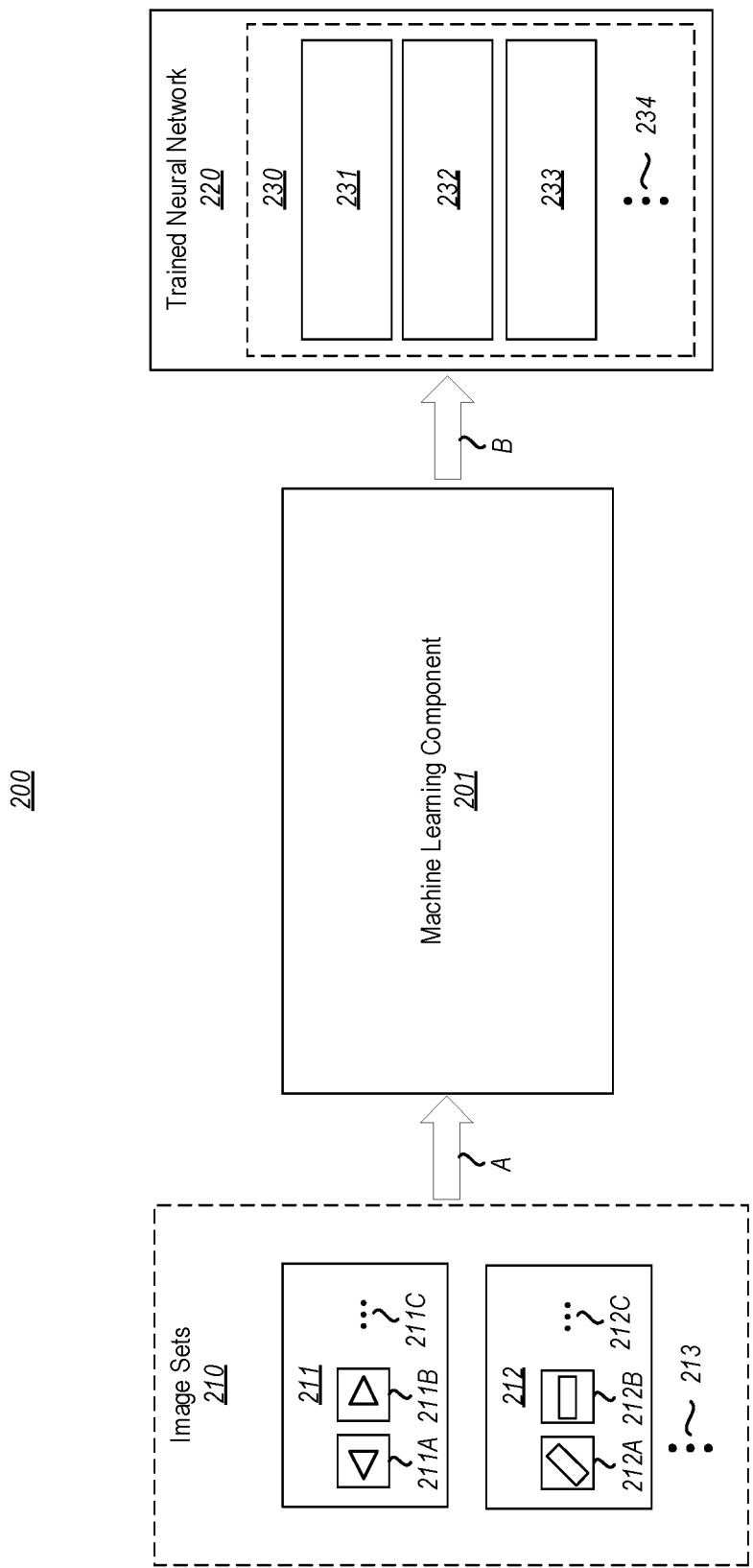
FIG. 2 illustrates a flow of a machine learning phase that represents an example of the machine learning phase of FIG. 1.

FIG. 2 illustrates a machine learning phase 200 that represents an example of the machine learning phase 110 of FIG. 1. In the machine learning phase 200, the machine learning component 201 (which may be structured as described below for the executable component 906 of FIG. 9) receives image sets 210 as represented by arrow A. Each image set depicts a respective item. As an example, image set 211 includes images 211A and 211B (amongst potentially others as represented by ellipsis 211C) that each depict the same triangle, albeit from different angles. The image set 212 includes images 212A and 212B (amongst potentially others as represented by ellipsis 212C) that each depict a rectangle, albeit from different angles. The ellipsis 213 represents that the image sets 210 may include any number of image sets, each image set depicting a respective item. Of course, the depicted triangle and rectangle are just a symbol of what could be depicted in images fed to the machine learning component 201. A more complex example would be an item offered for sale on an online catalog, such as perhaps a wearable (like a dress, piece of jewelry, or the like).

The machine learning component 201 trains a neural network using the received image sets. This trained neural network 220 is illustrated as being output (as represented by arrow B) by the machine learning component 201. The machine learning component 201 trained the neural network 220 using the received image sets 210 to thereby adapt the neural network to be able to recognize various features 230 of depicted items. As an example, the various features 230 that the neural network is trained to recognize include features 231, 232 and 233. However, the ellipsis 234 represents that the principles described herein are not limited to the number or type of features that the neural network 220 is trained to recognize.

Stated more technically, the trained neural network 220 is trained to generate multiple embedding vectors for a depicted item. As an example referred to herein as the "subject example", the feature 231 is an identity feature, the feature 232 is a category feature, and the feature 233 is a color feature. In that case, the trained neural network 220 is trained to review any image depicting any item to generate an identity embedding vector representing the identity feature 231 of the depicted item, a category embedding vector representing a category feature 232 of the depicted item, and a color embedding vector representing a color feature 233 of the depicted item. Although the neural network 220 may evaluate images of any depicted item, the neural network 220 will be most capable of recognizing features of depicted items that are most similar to the items depicted in the image set 210 used to train the neural network 220.

Figure 3:
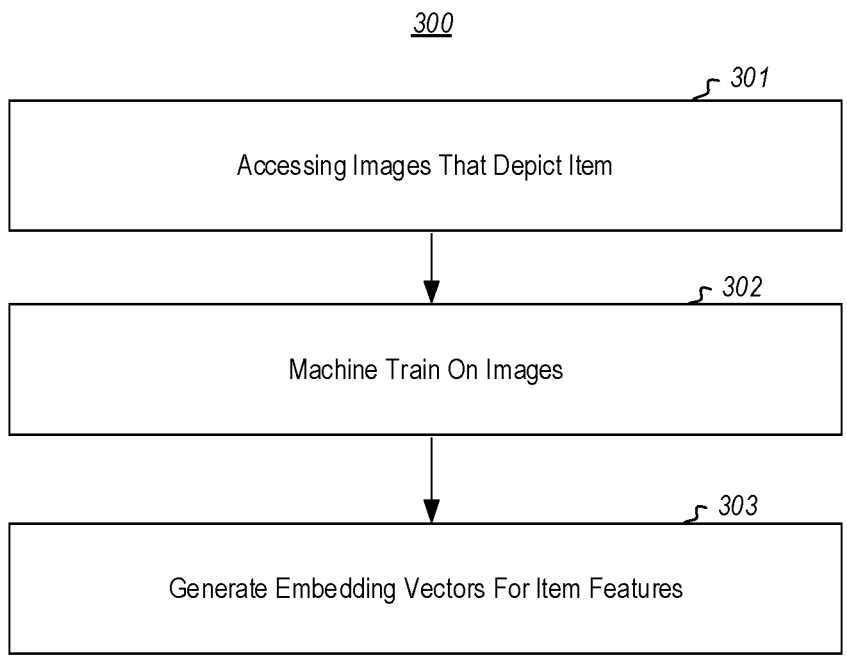
FIG. 3 illustrates a flowchart of a method for machine learning features of an item depicted in a plurality of images, in accordance with the principles described herein.

FIG. 3 illustrates a flowchart of a method 300 for machine learning features of an item depicted in a plurality of images, in accordance with the principles described herein. The method 300 may be performed as part of the machine learning phase 110 depicted in FIG. 1, or the machine learning phase 200 of FIG. 2. As a specific example, the method 300 may be performed by the machine learning component 201 of FIG. 2. Accordingly, the method 300 will be described with frequent reference to the subject example of FIG. 2.

The method 300 includes accessing images that depict an item (act 301). In the subject example of FIG. 2, the machine learning component accesses the image set 211 that depicts the triangle. The method 300 may be performed for each of the image sets in the image sets 210. However, the method 300 will now be described with respect to the image set 211.

Figure 5A:
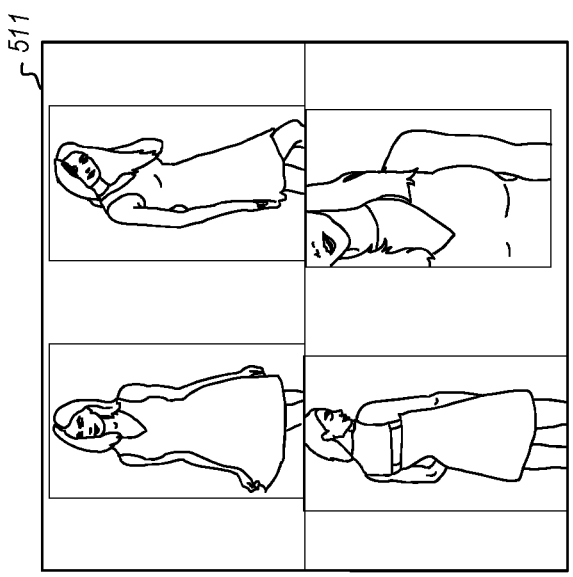
FIGS. 5A through 5F illustrate an example of processing associated with the machine learning phase.

FIG. 5A illustrates an example of the image set 211 in the form of input product images 511. In this example, there are four images of the same dress being modelled by a woman. As color cannot be included in patent drawings, imagine that the depicted dress is black. The application of the method 300 to the input product images will be referred to as the "dress example" and will be described with respect to FIGS. 5A through 5F. The method 300 then includes machine training on the images using a neural network (act 302). This results in the neural network generating multiple embedding vectors for each of multiple features of the item (act 303).

Figure 5B:
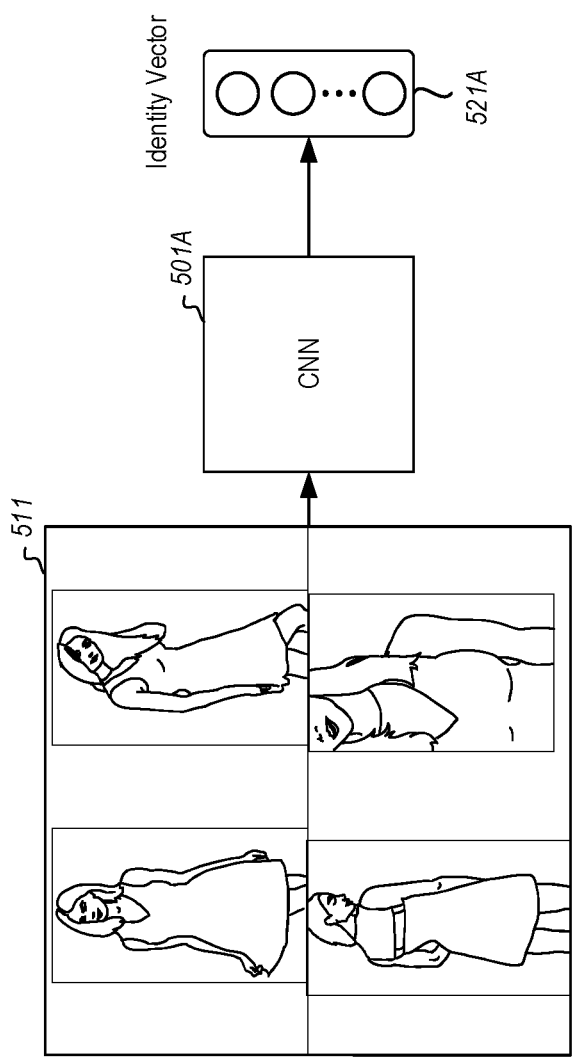
Figure 5C:
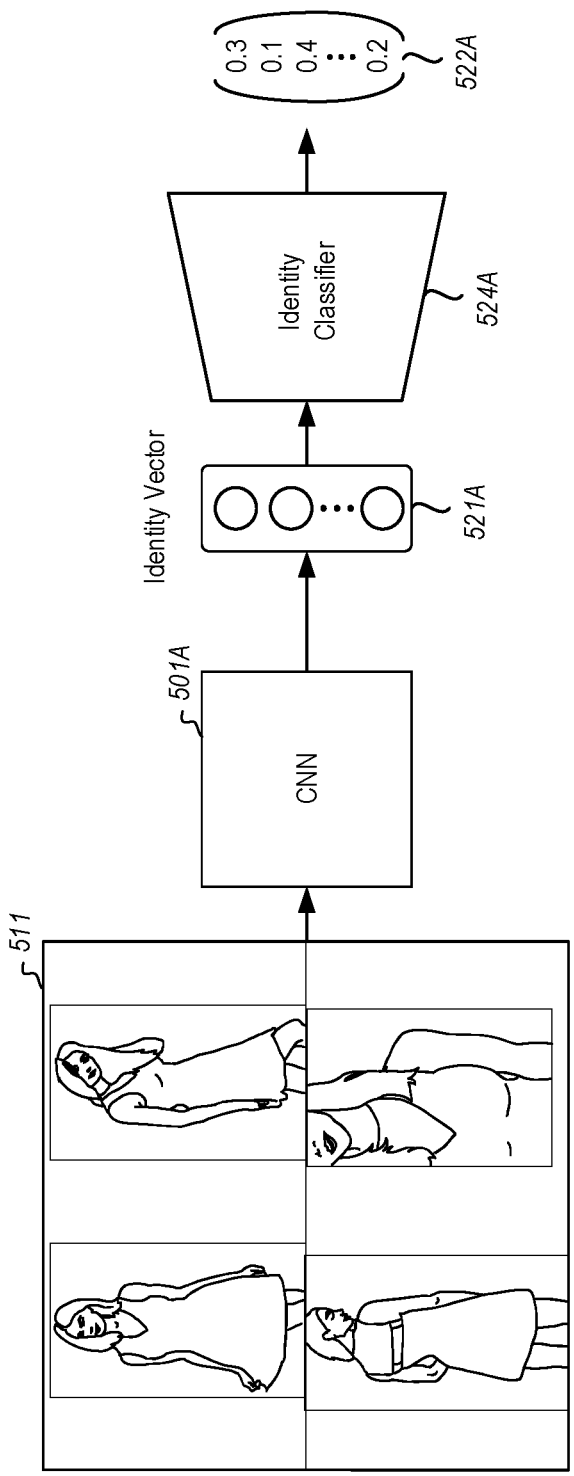

Referring to FIG. 5B, the input images 511 are provided to a neural network 501A to thereby generate an identity embedding vector 521A. The neural network 501A may be any neural network, an example being a convolutional neural network. The neural network 501A is an example of the neural network 220 of FIG. 2, albeit still in the process of being trained.

The identity embedding vector 521A is generated as a function of parameter values in the neural network 501A. This is simply the beginning of a first iteration of a machine learning process. Accordingly, the identity vector 521A likely at this stage does not very accurately represent the identity of the depicted product. The machine learning serves to refine the parameter values in the neural network 301A so as to more precisely identify products depicted in input images. Thus, after training has completed, the neural network 501A is able to more accurately generate an identity embedding vector for an identity of the depicted product.

Figure 4:
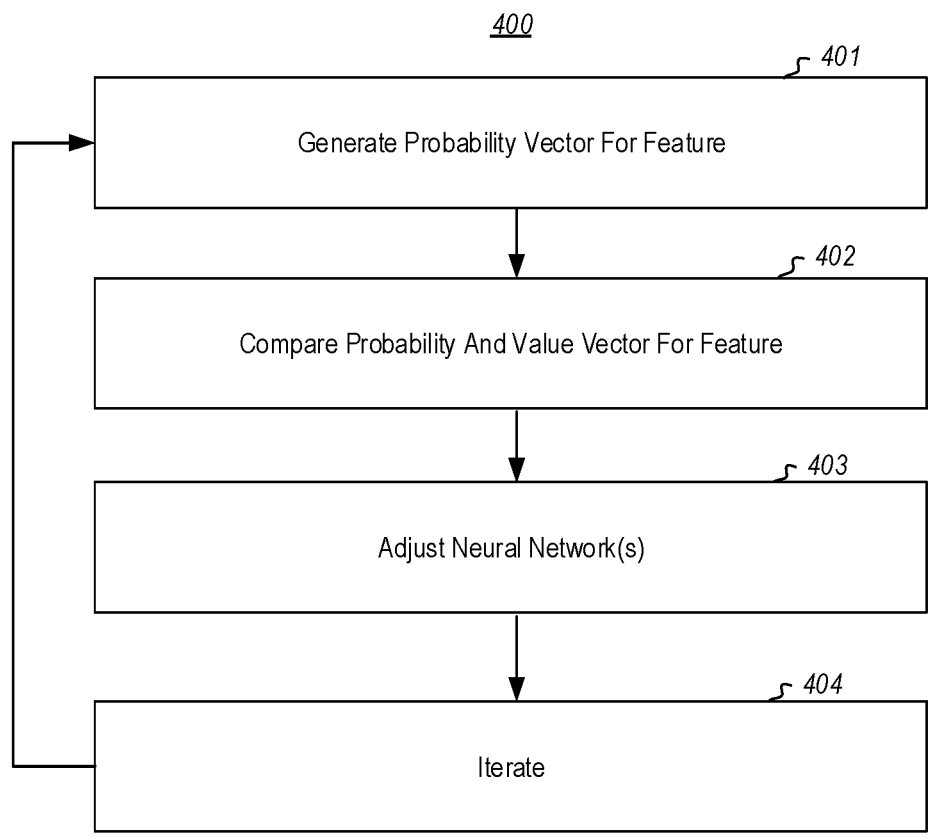
FIG. 4 illustrates a flowchart of a method for machine training on multiple images that depict an item, which may be performed for each of multiple features of the depicted item in accordance with the principles described herein.

FIG. 4 illustrates a flowchart of a method 400 for machine training on multiple images that depict an item. The method 400 may be performed for each of multiple features of the depicted item to thereby represent an example of the acts 302 and 303 of FIG. 3. The method 400 includes generating a probability vector that represents probabilities of values of the corresponding feature of the item (act 401). As an example in FIG. 5C, the identity vector 521A is provided to an identity classifier neural network 524A to generate a probability vector 522A that represents probabilities that the identity of the depicted item is of various values. As an example, the identity classifier neural network 524A may be a single layer neural network.

In this example, in the first iteration of the generation of identity vector 521A and the associated probability vector 522A, the neural networks 501A and 524A estimate that there is a thirty percent chance that the depicted item is of a first identity represented by the top-most position in the probability vector 522A, a ten percent chance that the depicted item is of a second identity represented by the second position in the probability vector 522A, a forty percent chance that the depicted item is of a third identity represented by the third position in the probability vector 522A, and a twenty percent chance that the depicted item is of a last identity represented by the last position in the probability vector 522A. The machine learning also serves to refine the parameter values in the neural network 501B so as to more precisely estimate probabilities.

Figure 5D:
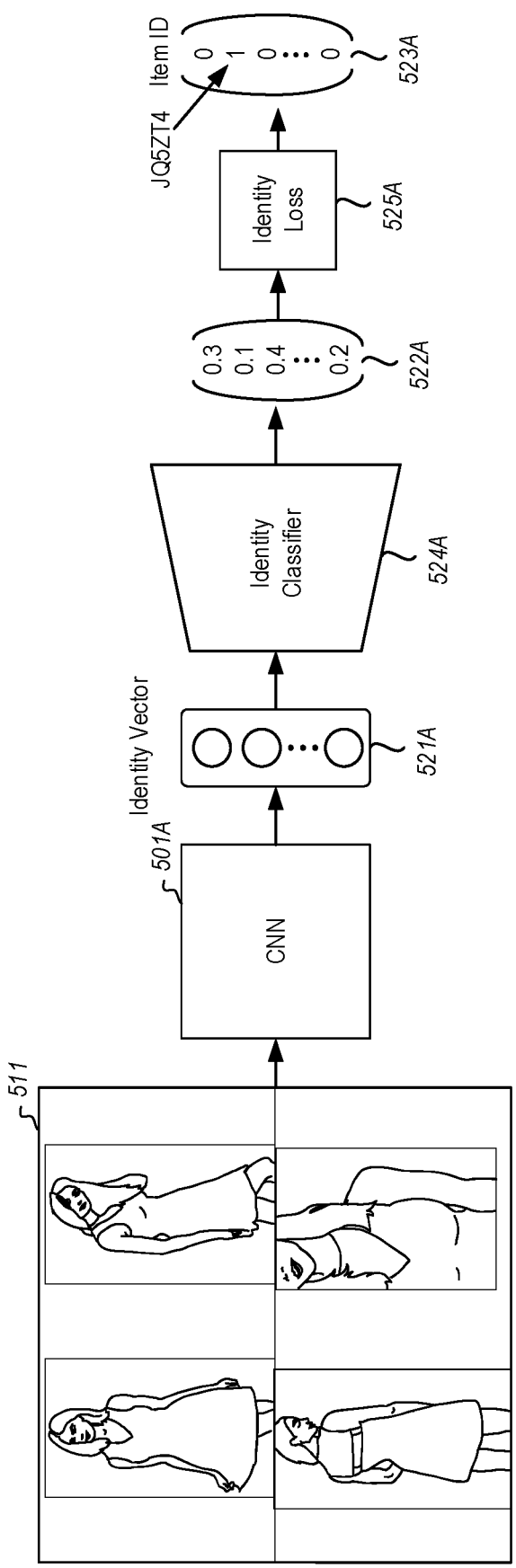

The method 400 then includes comparing the probability vector against a value vector of the same feature (act 402). FIG. 5D illustrates that an identity loss circuit 525A compares the identity probability vector 522A against an identity value vector 523A. The identity value vector 523A is a one hot vector in which the position of the vector corresponding to the actual identity of the depicted item is a binary one, and the remaining positions are a binary zero. Here there is a binary one corresponding to a position representing product ID JQ5ZT4. This identity loss circuit 525A may determine the distance between the position in n-dimensional space (where n is the number of positions of each of the vectors 522A and 523A) of the point represented by the vector 522A and the point represented by the vector 523A.

Based at least in part on the comparison of the probability vector 522A and the value vector 523A, the computing system changes the parameter values within the neural network 501A and potentially also the values in the neural network 524A. This completes one iteration of the machine learning process of FIG. 4 with respect to one of the features—the identity feature—of the depicted item.

Figure 5E:
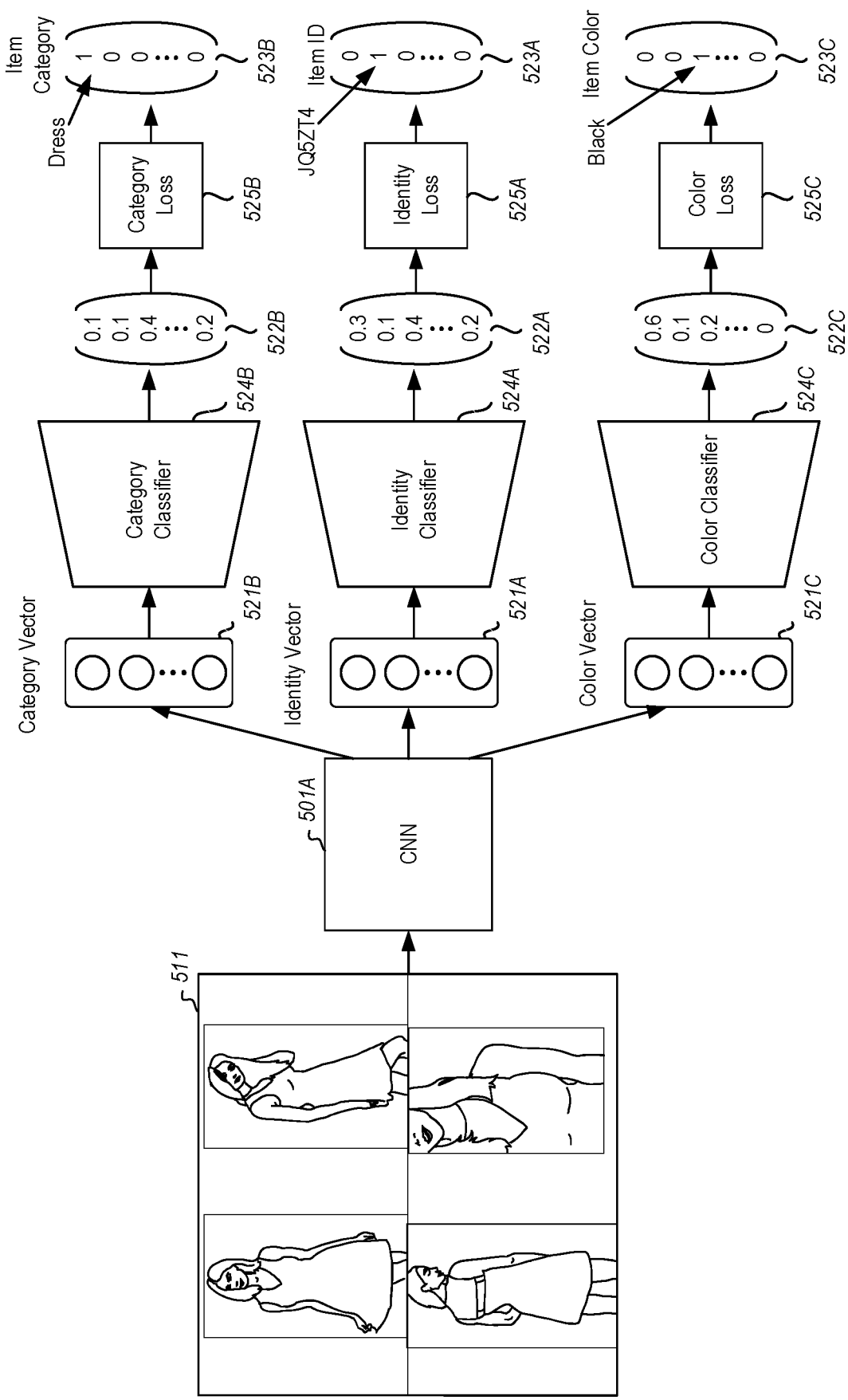

The method 400 may be performed for other features of the depicted item as well. FIG. 5E is similar to FIG. 5D, except that now the process associated with machine learning two additional embedding vectors are shown. In particular, the neural network 501A also generates a category embedding vector 521B. A category classifier neural network 524B generates a category probability vector 522B which represents probabilities that the depicted item is of a particular category. A category loss circuit 525B compares that category probability vector 522B against a category value vector 523B that represents an actual category (in this case, a dress category) of the depicted item. Similarly, the neural network 501A also generates a color embedding vector 521C. A color classifier neural network 524C generates a color probability vector 522C which represents probabilities that the depicted item is of a particular color. A color loss circuit 525C compares that color probability vector 522C against a color value vector 523C that represents an actual color (in this case, a black color) of the depicted item.

Returning to FIG. 4, parameter values of the neural networks may be adjusted (act 403) for the next iteration (act 404) of the method 400 to thereby over time reduce the difference between the probability and actual value vectors for each of the features. The adjustments in the neural networks then cause the probably vector to change again (act 401), causing a repeat of the comparison of the probability vector with the value vector (act 402), thereby causing a further adjustment.

Figure 5F:
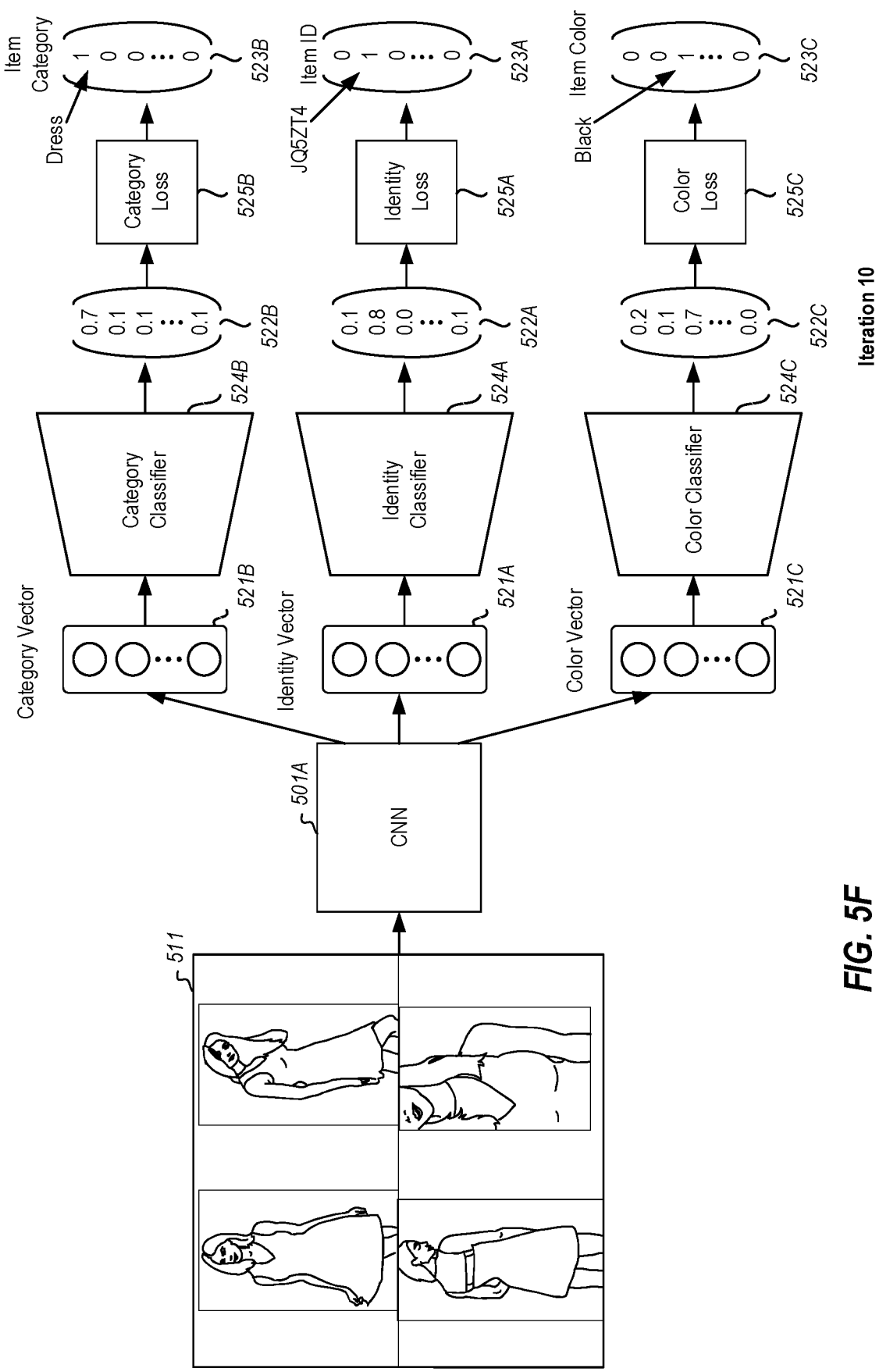

As an example with reference to FIG. 5F, after the result of the comparison of the identity loss circuit 525A for iteration j (where j is a positive integer), the identity loss circuit 525A causes the parameter values of the neural networks 501A and 524A to change prior to performing the next iteration j+1. Also, after the result of the comparison of the category loss circuit 525B for iteration j, the category loss circuit 525B causes the parameter values of the neural networks 501A and 524B to change prior to performing the next iteration j+1. In addition, after the result of the comparison of the color loss circuit 525C for iteration j, the color loss circuit 525C causes the parameter values of the neural networks 501A and 524C to change prior to performing the next iteration j+1. As seen in FIG. 5F, iterating through this process multiple times causes the probability vectors 522A, 522B and 522C to more accurately trend towards the respective value vectors 523A, 523B and 523C. The training may occur for a sufficient number of iterations so that the difference between the probability vector and the value vector is acceptably low.

FIGS. 5A through 5F illustrate an example of the training of the neural networks 501A, 524A, 524B and 524C on a single set of images 511 that represent a depicted item. In order to train the neural network to generate multiple embedding vectors associated with a variety of images depicting a variety of items, the same process may be performed for multiple sets of images, each set representing a different depicted item. Thus, the neural network 501A may be machine trained to accurately generate embedding vectors representing features of all sorts of depicted items, regardless of whether or not the neural network 501A has encountered a particular depicted item. Thus, an example of the activity of the machine learning component 201 in the machine learning phase 200 of FIG. 2 has been described with respect to FIGS. 3 through 5F.

Returning to FIG. 2, after the machine learning phase 200, there is now a trained neural network 220 available. Thus, referring to FIG. 1, after the machine learning phase 110 has completed, there is a trained neural network available for the searching phase 120. Furthermore, as described herein, and as shown in FIG. 2, that trained neural network is trained to recognize multiple different features of items depicted in input images.

Having described the machine learning phase 110, the searching phase 120 will now be described. Searching is founded upon determining how similar depicted items are. First, the searching will be described extending from the concrete dress example of FIGS. 5A through 5F. This will be done with respect to FIGS. 6A through 6C. Then, the searching phase will be more generally described thereafter with respect to FIGS. 7 and 8.

Figure 6A:
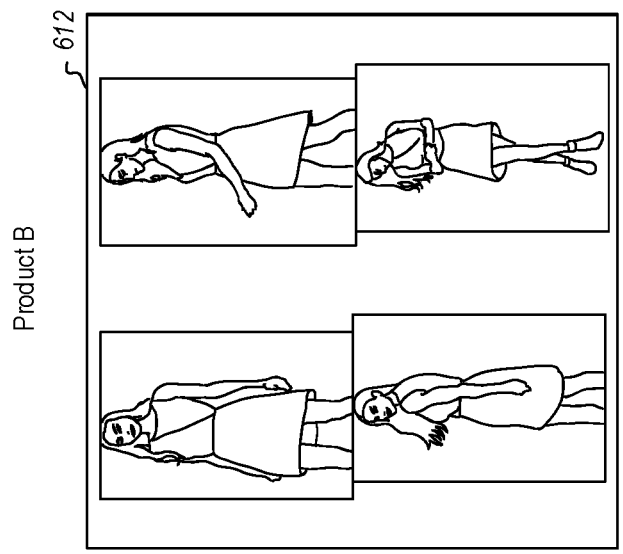
FIGS. 6A through 6C illustrate an example of processing associated with the searching phase.
Figure 6A:
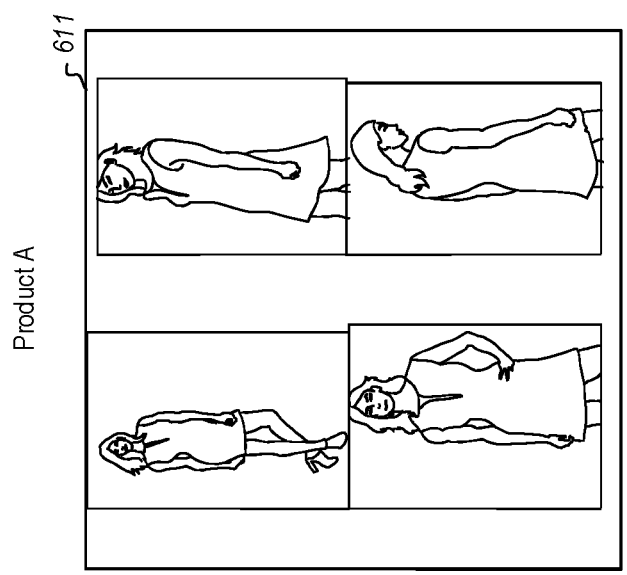
Figure 6B:
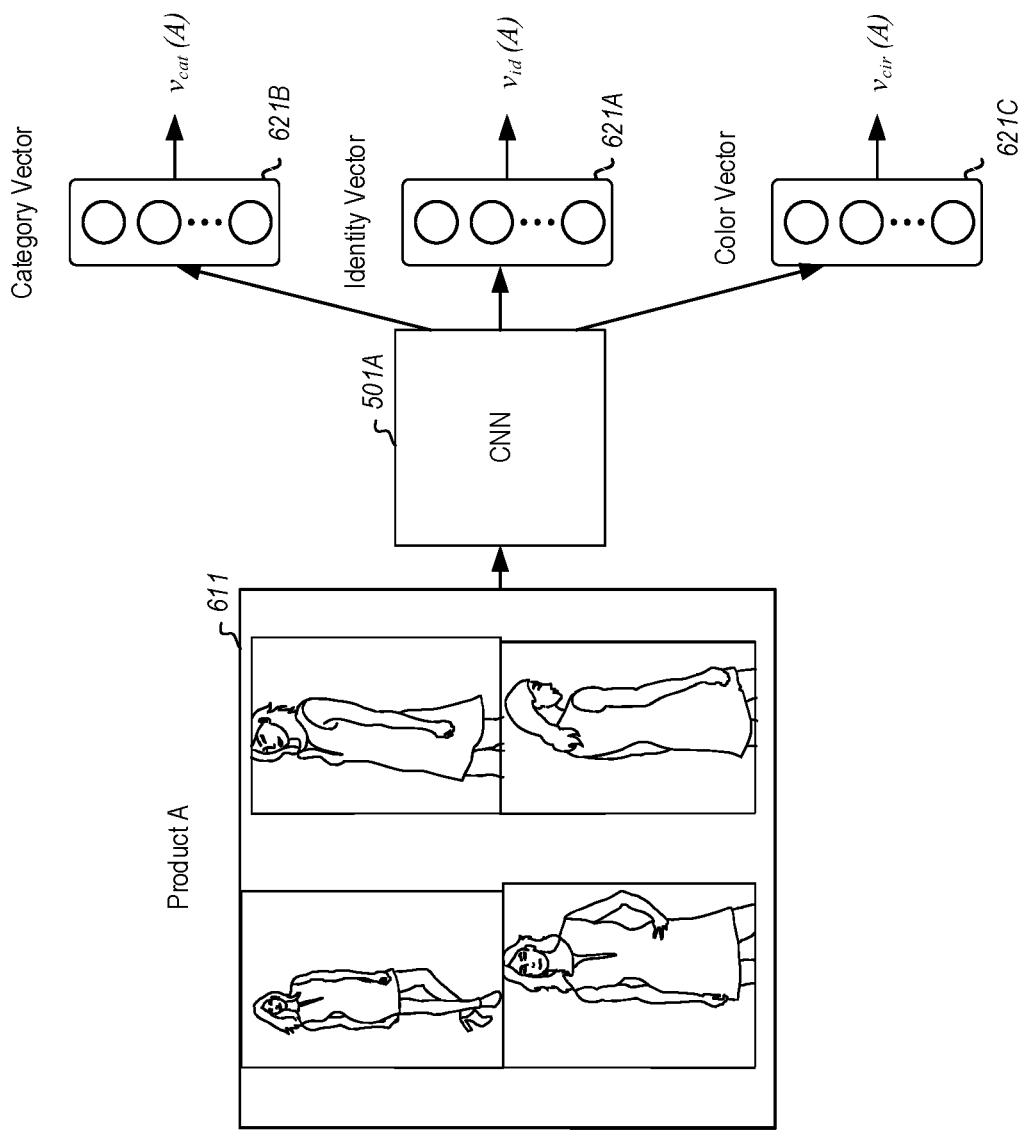
Figure 6C:
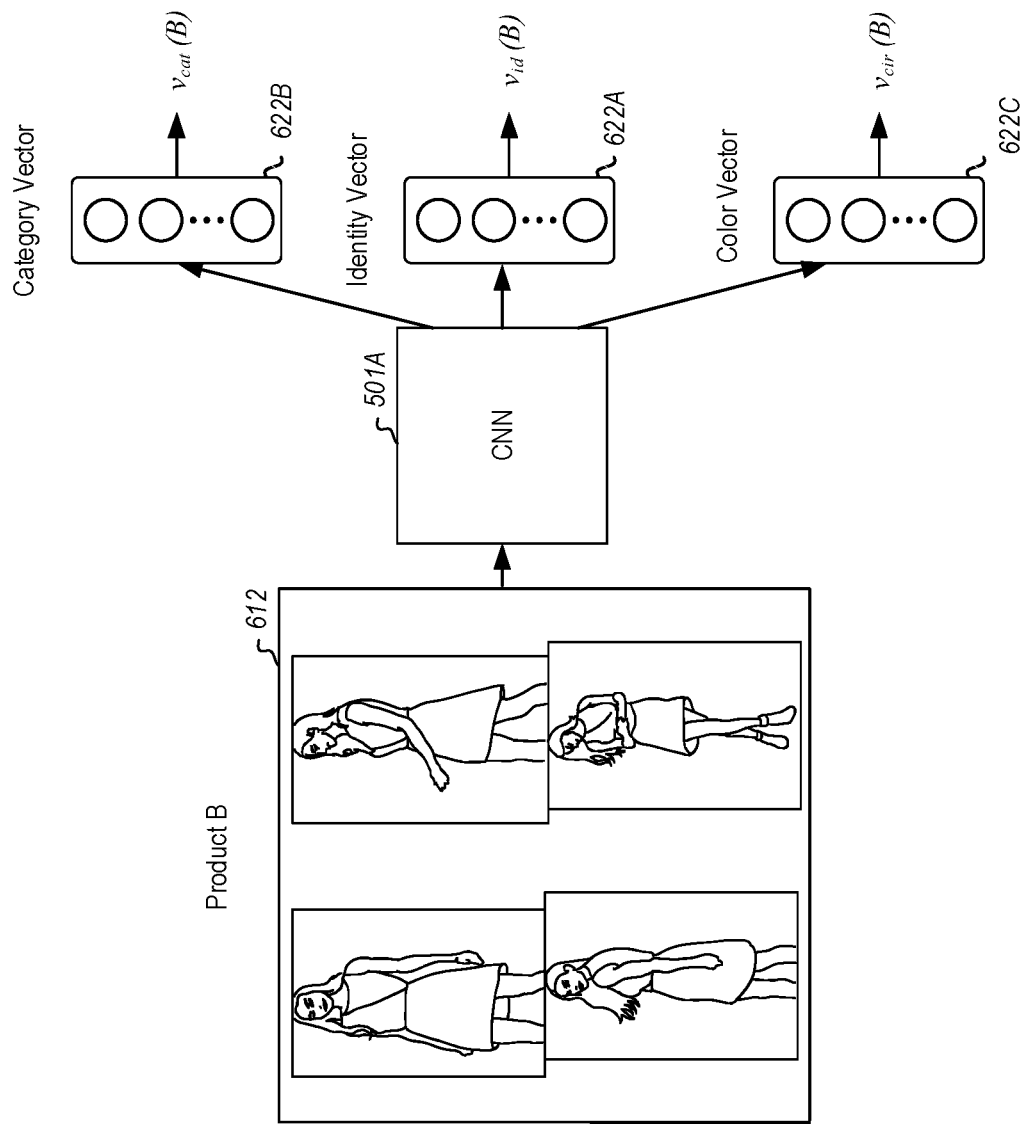

FIGS. 6A through 6C illustrate a mechanism to use the trained neural network 501A to determine similarity between depicted items. As an example, in FIG. 6A, suppose that the task is to determine how similar the dress depicted in the image set 611 is to the dress depicted in the image set 612. Recall that the neural network 501A has been trained to generate identity, category and color embedding vectors for each of a wide variety of depicted items.

Accordingly, in FIG. 6B, the trained neural network 501A generates an identity embedding vector 621A (shown as $v_{id}(A)$) representing an identity (e.g., a product A) of product A depicted in the image set 611, a category embedding vector 621B (shown as $v_{cat}(A)$) representing a category of the item depicted in the image set 611, and a color embedding vector 621C (shown as $v_{clr}(A)$) representing a color of the item depicted in the image set 611. Similarly, in FIG. 6C, the trained neural network 501A generates an identity embedding vector 622A (shown as $v_{id}(B)$) representing an identity (e.g., a product B) of product B depicted in the image set 612, a category embedding vector 622B (shown as $v_{cat}(B)$) representing a category of the item depicted in the image set 612, and a color embedding vector 622C (shown as $v_{clr}(B)$) representing a color of the item depicted in the image set 612.

The similarity between the depicted item in image set 611 (i.e., product A) and the depicted item in image set 612 (i.e., product B) may then be determined according to the following Equation 1.

$$\text{Similarity}(A, B) = \frac{1}{|w_{cat}| + |w_{id}| + |w_{clr}|} \tag{1}$$
$$\left(w_{cat}v_{cat}(A)^T v_{cat}(B) + w_{id}v_{id}(A)^T v_{id}(B) + w_{clr}v_{clr}(A)^T v_{clr}(B)\right)$$

Here, $w_{cat}$ represents a weighting of the category feature when determining how similar product A and product B are. $w_{id}$ represents a weighting of the identity feature when determining how similar product A and product B are. $w_{clr}$ represents a weighting of the color feature when determining how similar product A and product B are. In this example, the weightings $w_{cat}$, $w_{id}$ and $w_{clr}$ may take any value between −1 (negative one) and +1 (positive one). Thus, the similarity between two items may be determined with regard to several features of the items, where each feature may be configured to have a different weighting.

The user may also search not just for similar items as an input depicted item, but may also vary features. For example, if the user is interested in similar items to the input depicted item, but in a blue color, the user can simply change the search color to blue. This causes a special latent vector $v_{blue}$ to be used instead of $v_{clr}(A)$. Furthermore, the color weighting $v_{clr}$ may be set to one. The query would then take the form of Equation 2.

$$\text{Similarity}(A, B) = \tag{2}$$
$$\frac{1}{|w_{cat}| + |w_{id}| + |w_{clr}|} \left(w_{cat}v_{cat}(A)^T v_{cat}(B) + w_{id}v_{id}(A)^T v_{id}(B) + v_{blue}^T v_{clr}(B)\right)$$

Another example is if the query item is a necklace and the user wants to receive recommendations for earrings that share the same pattern or shape. The user could then just set the category to "earrings". This causes a special latent vector $v_{earrings}$ to be used instead of $v_{cat}(A)$. Furthermore, the category weighting $v_{cat}$ may be set to one. The query would then take the form of Equation 3.

$$\text{Similarity}(A, B) = \frac{1}{|w_{cat}| + |w_{id}| + |w_{clr}|} \tag{3}$$
$$\left(v_{earrings}(A)^T v_{cat}(B) + w_{id}v_{id}(A)^T v_{id}(B) + w_{clr}v_{clr}(A)^T v_{clr}(B)\right)$$

Now that a mechanism for determining similarity between items has been described, an example of the searching phase will now be described with respect to FIGS. 7 and 8.

Figure 7:
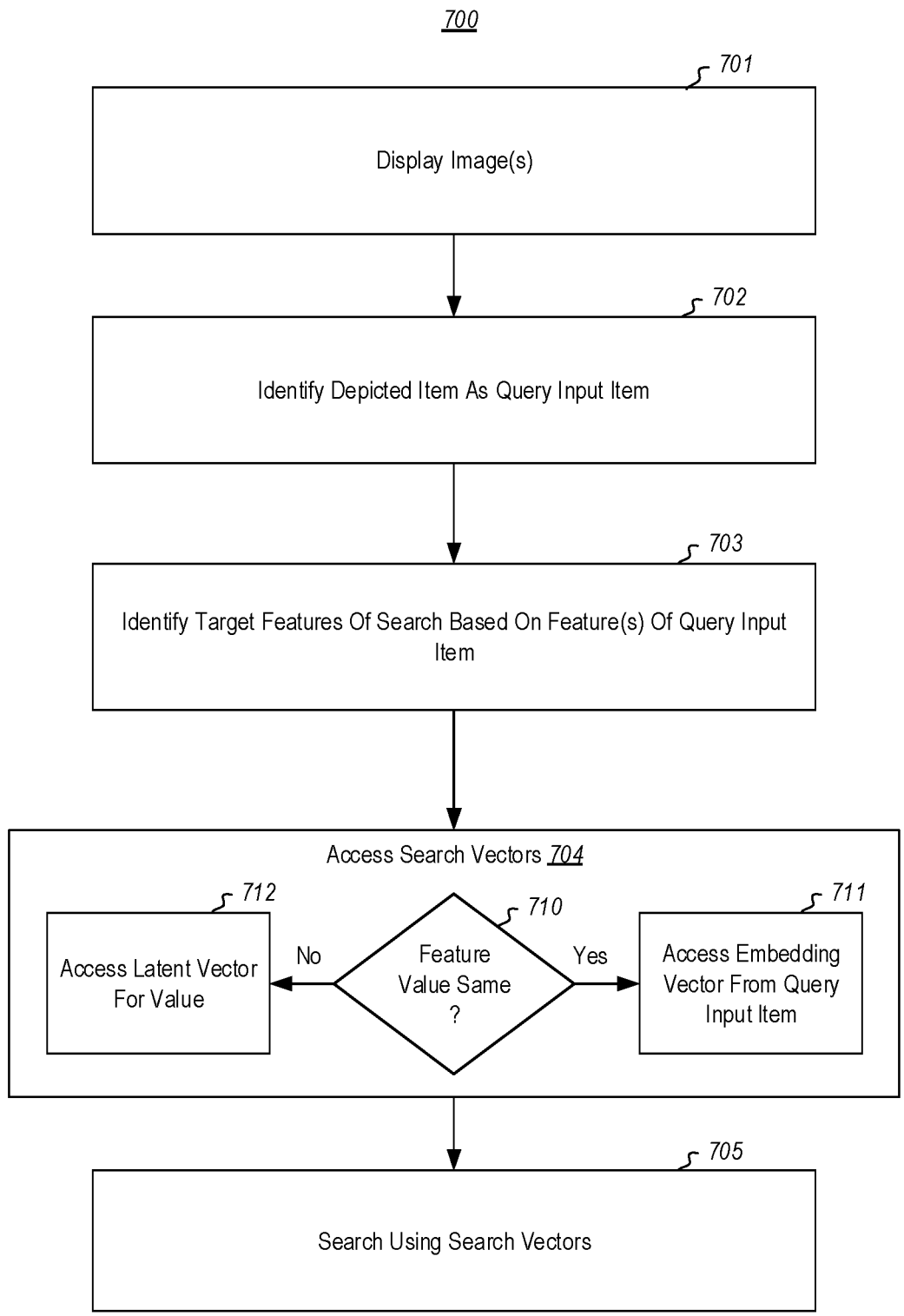
FIG. 7 illustrates a flowchart of a method for searching for an item based on a prior viewed item, in accordance with the principles described herein.

FIG. 7 illustrates a flowchart of a method 700 for searching for an item based on a prior viewed item. The method 700 includes causing one or more images of an input item to be displayed on a display of a computing system (act 701). As an example, one or more images of the dress depicted as product A in image set 611 may be displayed to a user. The user might decide that she likes the displayed dress, and wants to use that displayed dress to find similar items.

Accordingly, the user may interact with the computing system in such a way that the computing system identifies the displayed item as to be used as input in searching for a target item (act 702). Thus, the depicted item is identified as input to a search component that performs a search for similar target items. In other words, the depicted item is identified as a query input item. As an example, while product A of image set 611 is being displayed, the user might interface with the image(s) of the product A in such a way that product A is identified as a query input item. Note that the query input item (represented as product A) already has several embedding vectors including an identity embedding vector $v_{id}(A)$, a category embedding vector $v_{cat}(A)$, and a color embedding vector $v_{clr}(A)$.

The method 700 then includes identifying target features of a search based on features of the input item (act 703). Appropriate search vectors are then accessed (act 704). Specifically, for any feature that is to have a same value as the feature in the query item ("Yes" in decision block 710), the embedding vector for that feature of the query input item is accessed (act 711). On the other hand, for any feature that is to have a different value as the feature in the query item ("No" in decision block 710), a vector corresponding to that value and feature is accessed (act 712).

In the example of Equation 2 above, the user desired the category (e.g., dress) to be the same as the query input item, but wanted the color to be different (e.g., blue) from the query input item. Accordingly, the category embedding vector $v_{cat}(A)$ for the query input item was accessed for the search. In addition, a special color vector $v_{blue}$ was also accessed for the search. In the example of Equation 3 above, the user desired the category to be changed from the query input item (e.g., earring instead of dress). The user desired the color category to remain the same as the query input item. Accordingly, the color embedding vector $v_{clr}(A)$ for the query input item was accessed for the search. In addition, a special category vector $v_{earrings}$ was also accessed for the search.

The search is then performed using the accessed vectors (act 705). This is done by comparing the search vectors against vectors for potential target items. As an example Equations 2 and 3 each show a comparison of the query input item (product A) against a potential target item (product B). This comparison may be performed for any number of potential target items, to thereby result in matches that have the most similarity (where Similarity(A, B) is highest. Note that in the determination of each similarity for each the plurality of possible target items, the level of match was determined using a weighted combination of dot products.

Figure 8:
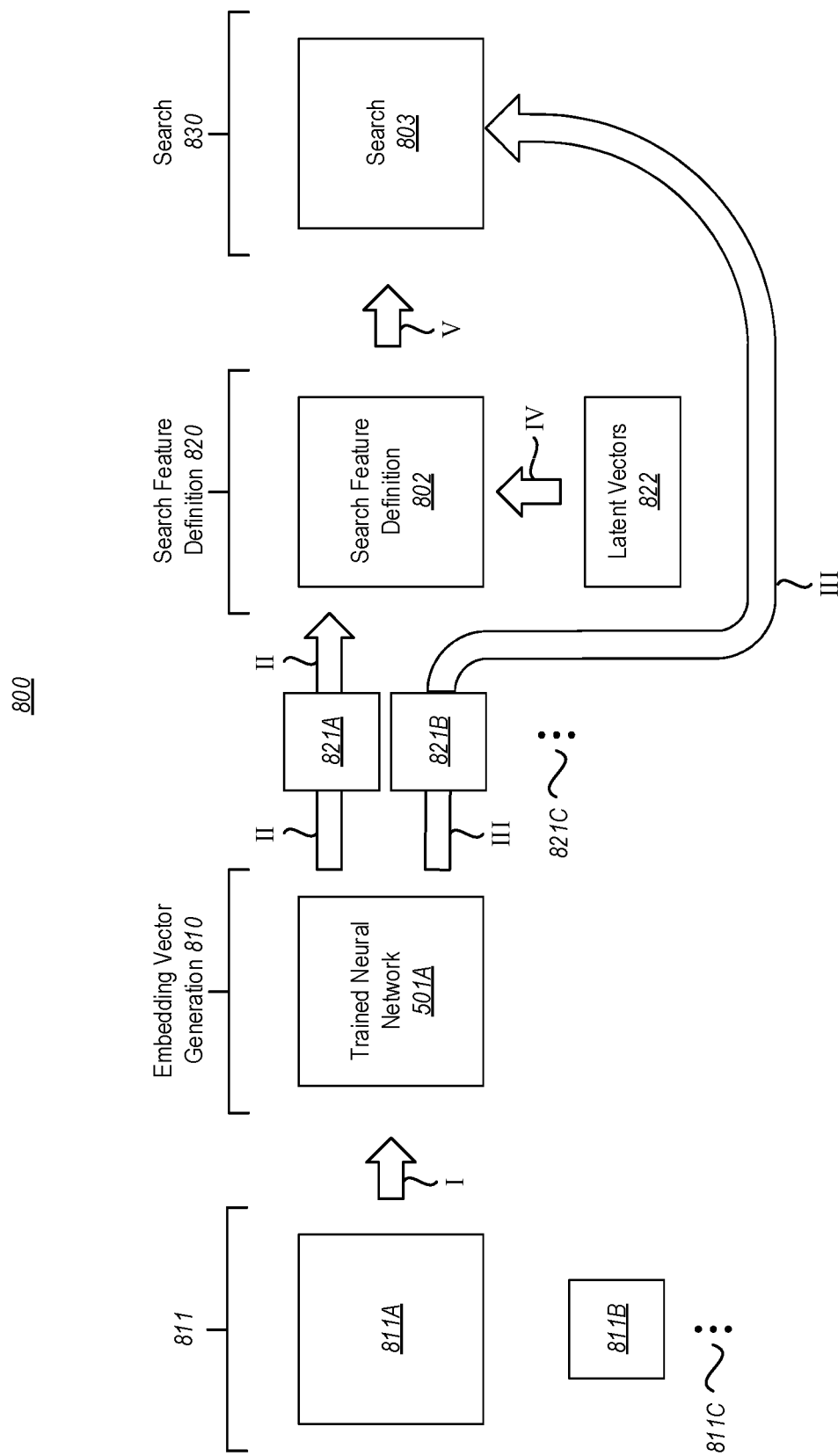
FIG. 8 illustrates an example searching flow in which the method of FIG. 7 may be performed, which includes three phases—an embedding vector generation phase, a search feature definition phase, and a search phase.

FIG. 8 illustrates an example searching flow 800 in which the method 700 may be performed. The flow 800 includes three phases—an embedding vector generation phase 810, a search feature definition phase 820, and a search phase 830. Each of the phases 810, 820 and 830 may be performed by a computing system, such as the computing system 900 described below with respect to FIG. 9. The same computing system may perform the phases 810, 820 and 830. Alternatively, different computing systems may perform different sets of one or more of the phases 110, 120 and 130. Furthermore, the embedding vector generation phase 810 may be performed any time prior to the search feature definition phase 820, and may be performed just prior or even well in advance of the search feature definition phase 820.

The phases 810, 820 and 830 may each be performed in response to one or more processors (e.g., the hardware processing unit 902) of the respective computing system (e.g., computing system 900) executing computer-executable instructions that are embodied on one or more computer-readable media (such as one or more computer-readable storage media). For instance, the phases may be performed by one or more processors of the executing computing system executing computer-executable instructions that are on one or more computer-readable media (e.g., memory 904).

In the embedding vector generation phase 810, the trained neural network 501A receives (as represented by arrow I) input images 811 depicting a variety of different items. At least one of those images 811A (e.g., image set 611 of FIG. 6) represents the query input product (e.g., product A). As a result, the trained neural network 501A generates (as represented by arrow II) the embedding vector set 821A for the query input product. In addition, as also represented by arrow I, the trained neural network 501A also receives at least one image (e.g., image set 612) for at least one target item (e.g., product B). This results in the neural network 501A generating embedding vector set 821B. As represented by ellipsis 811C and 821C, the neural network 501A ideally generates an embedding vector set for each of potentially many potential target items. In the example, each embedding vector set includes an identity embedding vector, a category embedding vector, and a color embedding vector.

In the search feature selection phase 820, a user may search for items that have features of various values. For instance, the search feature selection phase may involve a search feature component 802 (such as a user interface) presenting the user with the images 811A of the query input item, and allowing the user to use that query input item to define a new search. For example, for one or more features, the user may elect to keep the value for that feature, resulting in the respective embedding vector being used in the search. This results in the search feature definition component 802 accessing the appropriate embedding vector from the embedding vector set 821A for the query input item (as represented by arrow II). On the other hand, for one or more features, the user may elect to change the value for that feature. This results in the search feature definition component 802 accessing the appropriate latent vector from the latent vector set 822 (as represented by arrow IV).

In the subject example in which each item has an associated identity embedding vector, category embedding vector and color embedding vector, the user may choose to keep the category the same, but change the color. In that case the search feature definition component would access the category embedding vector from the embedding vector set 821A, and a color latency vector corresponding to the different color from the latent vectors 822. If the user were instead to see items having the same category but a different shape, the search feature definition component 802 would access the shape latency vector corresponding to the different shape from the latent vectors 822.

In the searching phase 830, as represented by arrow V, the searching component 803 receives the search vectors, which include the embedding vector(s) from the embedding vector set 821A generated from the query input item (for any features that are to be the same as for the query input item), and any latent vector(s) from the latent vectors 822 (for any features that are to be different from the query input item). As represented by arrow VI, the searching component 803 also receives the embedding vector sets (821B) for each of the target items that the search vectors are to be compared against for similarity. The searching component 803 then performs the search (act 803). Those target items with a highest similarity score may then be shown as query results.

Accordingly, the principles described herein permit a query input item to be used in search, but allow some of the features to be the same, and some different, in the target items included in the query results. As an example, the user may keep the category the same, but change the color or shape. The user may keep the color the same, but change the category or shape. The user may keep the shape the same, but change the category. The user may thus search based on the query input item, while allowing the user to change the searched for features.

Note that the performance of the methods 300, 400 and 700 may be performed by a computing system. Accordingly, a computing system will now be described with respect to FIG. 9. Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 9:
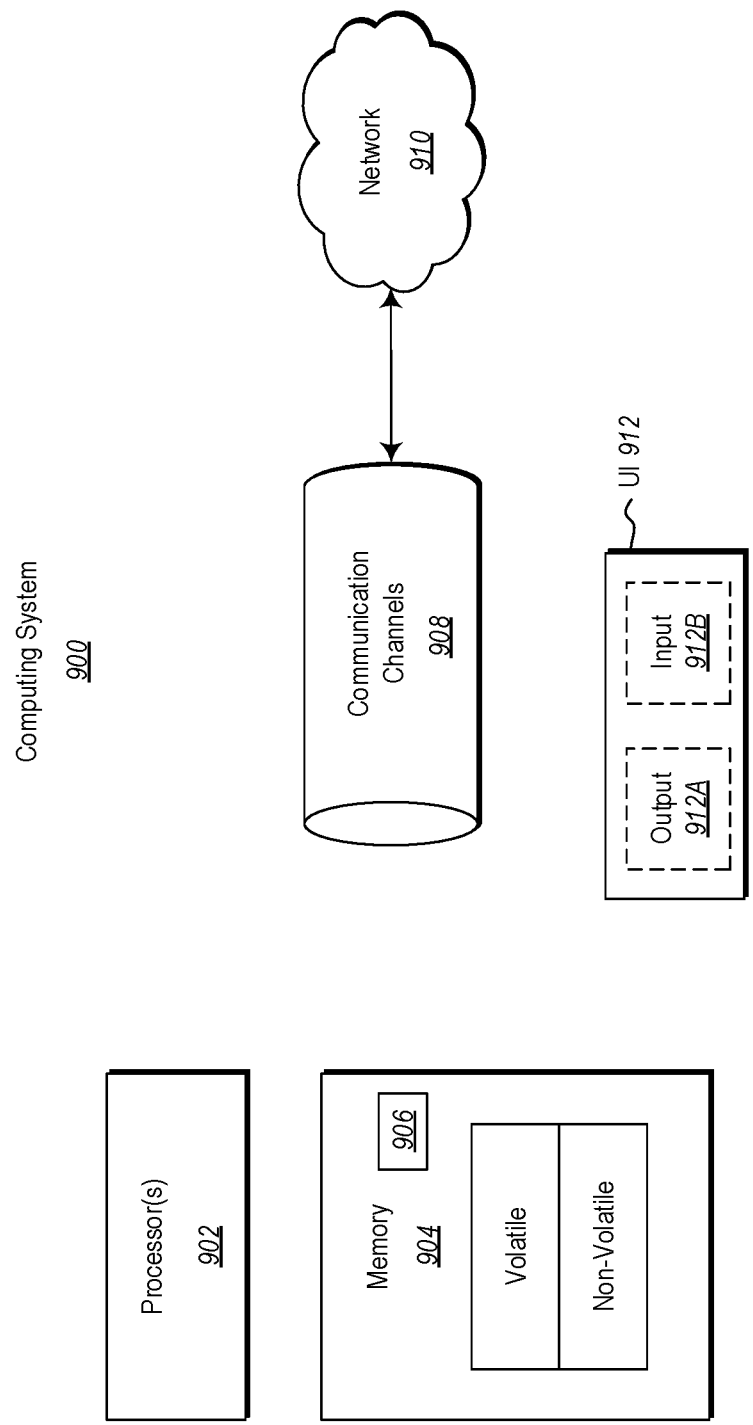
FIG. 9 illustrates an example computer system in which the principles described herein may be employed.

As illustrated in FIG. 9, in its most basic configuration, a computing system 900 typically includes at least one hardware processing unit 902 and memory 904. The memory 904 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 900 has thereon multiple structures often referred to as an "executable component". For instance, the memory 904 of the computing system 900 is illustrated as including executable component 906. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 904 of the computing system 900. Computing system 900 may also contain communication channels 908 that allow the computing system 900 to communicate with other computing systems over, for example, network 910.

While not all computing systems require a user interface, in some embodiments, the computing system 900 includes a user interface 912 for use in interfacing with a user. The user interface 912 may include output mechanisms 912A as well as input mechanisms 912B. The principles described herein are not limited to the precise output mechanisms 912A or input mechanisms 912B as such will depend on the nature of the device. However, output mechanisms 912A might include, for instance, speakers, displays, tactile output, holograms, virtual reality, and so forth. Examples of input mechanisms 912B might include, for instance, microphones, touchscreens, holograms, virtual reality, cameras, keyboards, mouse or other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media include RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system that trains a neural network to identify machine recognizable features of an item that is embodied in an image and to use the neural network to identify other items that have similar features to the machine recognizable features, said computing system comprising:
    at least one processor; and
    at least one hardware storage device that stores instructions that are executable by the at least one processor to cause the computing system to:
        access a plurality of images, wherein each image in the plurality of images provides a different visualization of a same item;
        machine train on the plurality of images using a neural network to identify a plurality of features of the item;
        generate a plurality of vectors for each feature in the plurality of features such that the neural network is trained on multiple features of the item, wherein the plurality of vectors includes an identity embedding vector that provides a supposed identity for the item; and
        use at least one vector included in the plurality of vectors to facilitate a search for one or more different items that are determined to meet a similarity requirement with regard to the item in the plurality of images, wherein:
            a search definition for the search includes accessing a latent vector that describes a user-specified change to at least one feature included in the plurality of features, and
            the search is based on a combination of said at least one vector and the latent vector such that the search involves searching for different items that are identified as having the changed at least one feature.

2. The computing system of claim 1, wherein a first feature of the plurality of features comprises an actual identity of the item.

3. The computing system of claim 2, wherein a second feature of the plurality of features comprises a category of the item.

4. The computing system of claim 2, wherein a second feature of the plurality of features comprises a shape of the item.

5. The computing system of claim 2, wherein a second feature of the plurality of features comprises a color of the item.

6. The computing system of claim 1, wherein a first feature of the plurality of features comprises at least one of: an actual identity of the item, a category of the item, a shape of the item, or a color of the item.

7. The computing system of claim 1, wherein the plurality of vectors comprises at least (i) a first embedding vector representing a first feature of the item and (ii) a second embedding vector representing a second feature of the item.

8. The computing system of claim 1, wherein parameters of the neural network are subsequently adjusted.

9. The computing system of claim 1, wherein the plurality of vectors includes an embedding vector.

10. The computing system of claim 1, wherein the plurality of vectors includes a probability vector.

11. The computing system of claim 1, wherein the plurality of vectors includes an embedding vector and a probability vector.

12. The computing system of claim 1, wherein execution of the instructions further causes the computing system to:
   access a second plurality of images that depict a second item; and
   machine train on the second plurality of images using the neural network to generate a second plurality of vectors for each of a plurality of features of the second item.

13. The computing system of claim 12, wherein the second plurality of vectors comprise at least a first embedding vector that represents a first feature of the first item.

14. The computing system of claim 1, wherein the identity embedding vector is used to generate a probability vector.

15. The computing system of claim 1, wherein the plurality of vectors includes a color probability vector.

16. A method for training a neural network to identify machine recognizable features of an item that is embodied in an image and to use the neural network to identify other items that have similar features to the machine recognizable features, the method comprising:
   accessing a plurality of images, wherein each image in the plurality of images provides a different visualization of a same item;
   machine training on the plurality of images using a neural network to identify a plurality of features of the item;
   generating a plurality of vectors for each feature in the plurality of features such that the neural network is trained on multiple features of the item, wherein the plurality of vectors includes an identity embedding vector that provides a supposed identity for the item;
   using at least one vector included in the plurality of vectors to facilitate a search for one or more different items that are determined to meet a similarity requirement with regard to the item in the plurality of images, wherein:
      a search definition for the search includes accessing a latent vector that describes a user-specified change to at least one feature included in the plurality of features, and
      the search is based on a combination of said at least one vector and the latent vector such that the search involves searching for different items that are identified as having the changed at least one feature.

17. The method in accordance with claim 16, wherein a first feature of the plurality of features comprises an actual identity of the item.

18. The method in accordance with claim 16, wherein the identity embedding vector is used to generate a probability vector.

19. The method in accordance with claim 16, wherein the plurality of vectors includes a category probability vector.

20. At least one hardware storage device that stores instructions that are executable by at least one processor of a computer system to cause the computer system to access a plurality of images, wherein each image in the plurality of images provides a different visualization of a same item;
   machine train on the plurality of images using a neural network to identify a plurality of features of the item;
   generate a plurality of vectors for each feature in the plurality of features such that the neural network is trained on multiple features of the item, wherein the plurality of vectors includes an identity embedding vector that provides a supposed identity for the item;
   use at least one vector included in the plurality of vectors to facilitate a search for one or more different items that are determined to meet a similarity requirement with regard to the item in the plurality of images, wherein:
      a search definition for the search includes accessing a latent vector that describes a user-specified change to at least one feature included in the plurality of features, and
      the search is based on a combination of said at least one vector and the latent vector such that the search involves searching for different items that are identified as having the changed at least one feature.

* * * * *